US008683247B2

(12) United States Patent
Lerman

(10) Patent No.: US 8,683,247 B2
(45) Date of Patent: Mar. 25, 2014

(54) METHOD AND APPARATUS FOR CONTROLLING POWER SUPPLY TO PRIMARY PROCESSOR AND PORTION OF PERIPHERAL DEVICES BY CONTROLLING SWITCHES IN A POWER/RESET MODULE EMBEDDED IN SECONDARY PROCESSOR

(75) Inventor: Mikhael Lerman, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 791 days.

(21) Appl. No.: 12/137,630

(22) Filed: Jun. 12, 2008

(65) Prior Publication Data

US 2009/0313492 A1      Dec. 17, 2009

(51) Int. Cl.
  *G06F 1/00* (2006.01)
(52) U.S. Cl.
  USPC ............................. 713/323; 713/300; 713/324
(58) Field of Classification Search
  USPC .................................................. 713/300–340
  See application file for complete search history.

(56) References Cited

U.S. PATENT DOCUMENTS

| 6,092,134 | A  * | 7/2000  | Chun et al. ..................... 710/301 |
| 6,105,142 | A  * | 8/2000  | Goff et al. ..................... 713/324 |
| 6,154,508 | A    | 11/2000 | Ott |
| 6,631,474 | B1 * | 10/2003 | Cai et al. ..................... 713/300 |
| 2002/0095609 | A1 | 7/2002  | Tokunaga |
| 2005/0122653 | A1 | 6/2005  | McCluskey et al. |
| 2005/0135033 | A1 | 6/2005  | Kitagawa et al. |
| 2005/0182978 | A1 | 8/2005  | Anderson et al. |
| 2005/0289367 | A1 * | 12/2005 | Clark et al. .................. 713/300 |
| 2006/0031625 | A1 | 2/2006  | Chan |
| 2006/0212733 | A1 | 9/2006  | Hamilton |
| 2007/0094444 | A1 * | 4/2007  | Sutardja ..................... 711/112 |
| 2007/0157036 | A1 * | 7/2007  | Jahagirdar et al. ............ 713/300 |
| 2007/0176677 | A1 | 8/2007  | Apel |
| 2008/0072014 | A1 * | 3/2008  | Krishnan et al. ................ 712/43 |

(Continued)

FOREIGN PATENT DOCUMENTS

| JP | H08255040 A | 10/1996 |
| JP | 2002-215597 A | 8/2002 |

(Continued)

OTHER PUBLICATIONS

International Search Report for Application No. PCT/US09/03479, Issued Jul. 23, 2009, 4 pages.
First Office Action issued Jan. 11, 2013, in Chinese Patent Application No. 200980121980.8 with English language translation.

(Continued)

*Primary Examiner* — Thomas Lee
*Assistant Examiner* — Xuxing Chen
(74) *Attorney, Agent, or Firm* — Sterne, Kessler, Goldstein & Fox PL.L.C.

(57) ABSTRACT

An apparatus, method, and system are provided for optimizing computer performance while a first processor is in a sleep mode of operation. For example, an embodiment of the apparatus includes a first processor, a second processor (also referred to herein as a "sleep" processor), and one or more peripheral devices. When the first processor is in a sleep mode of operation, the sleep processor is configured to control one or more functions of the computer system incorporating the first processor and the sleep processor. These functions can include applications that may not otherwise be executed while the first processor is in sleep mode such as, for example, functions of the one or more peripheral devices. As a result, power management of the computer system is improved since the first processor remains in sleep mode for a longer period of time.

23 Claims, 8 Drawing Sheets

(56) References Cited

U.S. PATENT DOCUMENTS

| | | | |
|---|---|---|---|
| 2008/0133943 A1* | 6/2008 | Jorgenson et al. | 713/300 |
| 2008/0184042 A1* | 7/2008 | Parks et al. | 713/300 |
| 2009/0102618 A1* | 4/2009 | Iwai | 340/310.11 |

FOREIGN PATENT DOCUMENTS

| | | |
|---|---|---|
| JP | 2003-295984 A | 10/2003 |
| JP | 2005-184623 A | 7/2005 |
| JP | 2006-190197 A | 7/2006 |
| JP | 2006-323761 A | 11/2006 |

OTHER PUBLICATIONS

Office Action dispatched Apr. 24, 2013, in Japanese Patent Application No. 2011-513492, Mr. Hayakawa Yuji et al., drafted Apr. 17, 2013 with English language translation.
English language abstract of Japanese Patent No. JP H08255040 A European Patent Office, espacenet database—Worldwide.
English language abstract of Japanese Patent No. JP 2003-295984 A European Patent Office, espacenet database—Worldwide.
English language abstract of Japanese Patent No. JP 2006-190197 A European Patent Office, espacenet database—Worldwide.
English language abstract of Japanese Patent No. JP 2006-323761 A European Patent Office, espacenet database—Worldwide.

* cited by examiner

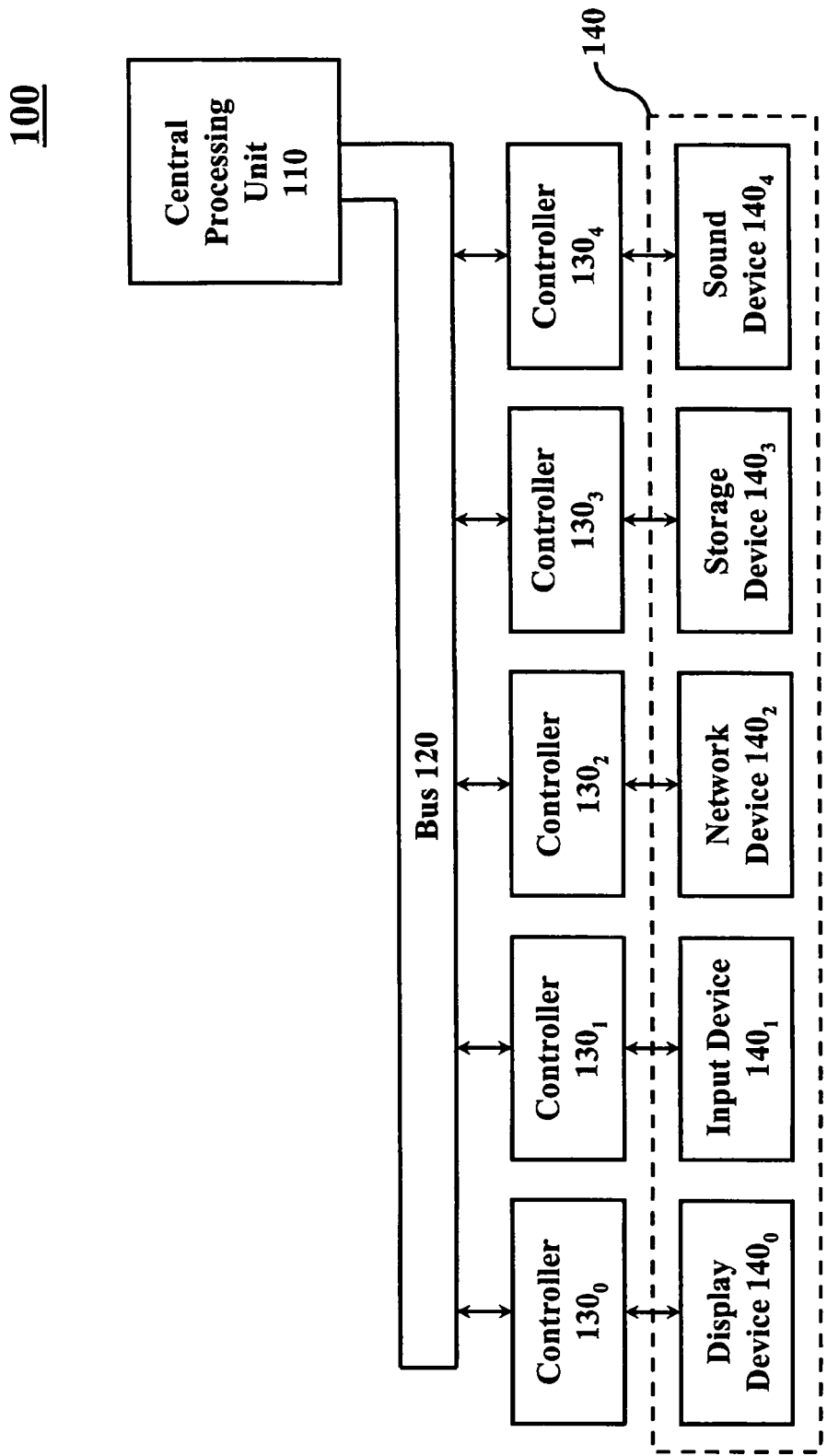
Figure 1
(Conventional)

METHOD AND APPARATUS FOR CONTROLLING POWER SUPPLY TO PRIMARY PROCESSOR AND PORTION OF PERIPHERAL DEVICES BY CONTROLLING SWITCHES IN A POWER/RESET MODULE EMBEDDED IN SECONDARY PROCESSOR

BACKGROUND

1. Field of the Invention

The present invention relates generally to optimizing computer performance during a processor's sleep mode of operation.

2. Background

Power dissipation is a major consideration in the design of central processing units (CPUs) and the computers in which they are used. Many computers are configured to enter a "sleep" mode of operation in order to reduce power consumption when processing is not required. Typically, in sleep mode, the computer is rendered inactive and its CPU stops executing instructions. Although the computer is inactive, a limited number of computer devices remain active (e.g., keyboard, mouse, and Universal Serial Bus (USB) ports) and when these devices are triggered by a user input, the computer awakens into an active state. For instance, a keystroke on a keyboard or a click of a mouse may awaken the computer from sleep mode.

However, other computer functions and devices are powered down or inactive during sleep mode. These computer functions and devices include, for example, a display device (e.g., monitor), a network device (e.g., internet connection), and a sound device (e.g., sound adapter). The computer and its CPU must exit its low-power sleep mode of operation before the user can execute these devices.

For computer programs that do not require optimal performance from the CPU, the CPU unnecessarily expends a significant amount of power on these types of applications. This power dissipation is mostly attributed to switching devices in the CPU and energy lost in the form of heat due to a resistivity of electrical circuits. For instance, even though an application executed on the computer may not require a high CPU clock speed, the CPU runs at its high clock speed regardless of the complexity of the application. As the CPU continues to exit sleep mode to execute less computationally intensive applications, the CPU unnecessarily expends more power than required and can increase the risk of device failure, thus decreasing the reliability of the computer.

In addition, for low-power applications such as portable handheld devices, the unnecessary dissipation of power from the CPU drains battery life at a higher rate, thus reducing the performance of the device.

Accordingly, what is needed is an improved apparatus and method to optimize computer performance during a processor's sleep mode of operation.

SUMMARY

Embodiments of the invention include an apparatus for optimizing computer performance while a first processor is in sleep mode. The apparatus includes one or more peripheral devices coupled to the first processor and to a second processor. The apparatus can also include a bus configured to provide a data communication path between the first processor, the second processor, and the one or more peripheral devices. The one or more peripheral devices can include a controller coupled to each peripheral device that is configured to manage data traffic between its respective peripheral device and the first and second processors. The first processor is configured to control the one or more peripheral devices during an active mode of operation.

While the first processor is in sleep mode, the second processor is configured to control at least one or more peripheral devices. The second processor can be configured to control functions of the one or more peripheral devices that could not otherwise be controlled while the first processor is in sleep mode. To further reduce power consumption in the computer system incorporating the first and second processors, the second processor can operate at a slower frequency during sleep mode, thus taking a longer time to execute a particular computing task than the first processor.

Embodiments of the invention include a method for optimizing computer performance while a first processor is in sleep mode. The method includes controlling one or more peripheral devices with the first processor during an active mode of operation and controlling the one or more peripheral devices with a second processor during the sleep mode of operation. The method can also include providing a data communication path between the first processor, the second processor, and the one or more peripheral devices.

Embodiments of the invention include a system for optimizing computer performance while a first processor is in sleep mode. The system includes a first module to control one or more peripheral devices with the first processor during an active mode of operation and a second module to control the one or more peripheral devices with a second processor during the sleep mode of operation. The system can also include a third module to provide a data communication path between the first processor, the second processor, and the one or more peripheral devices.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 1 is an illustration of a conventional computer system.

Figure 2:
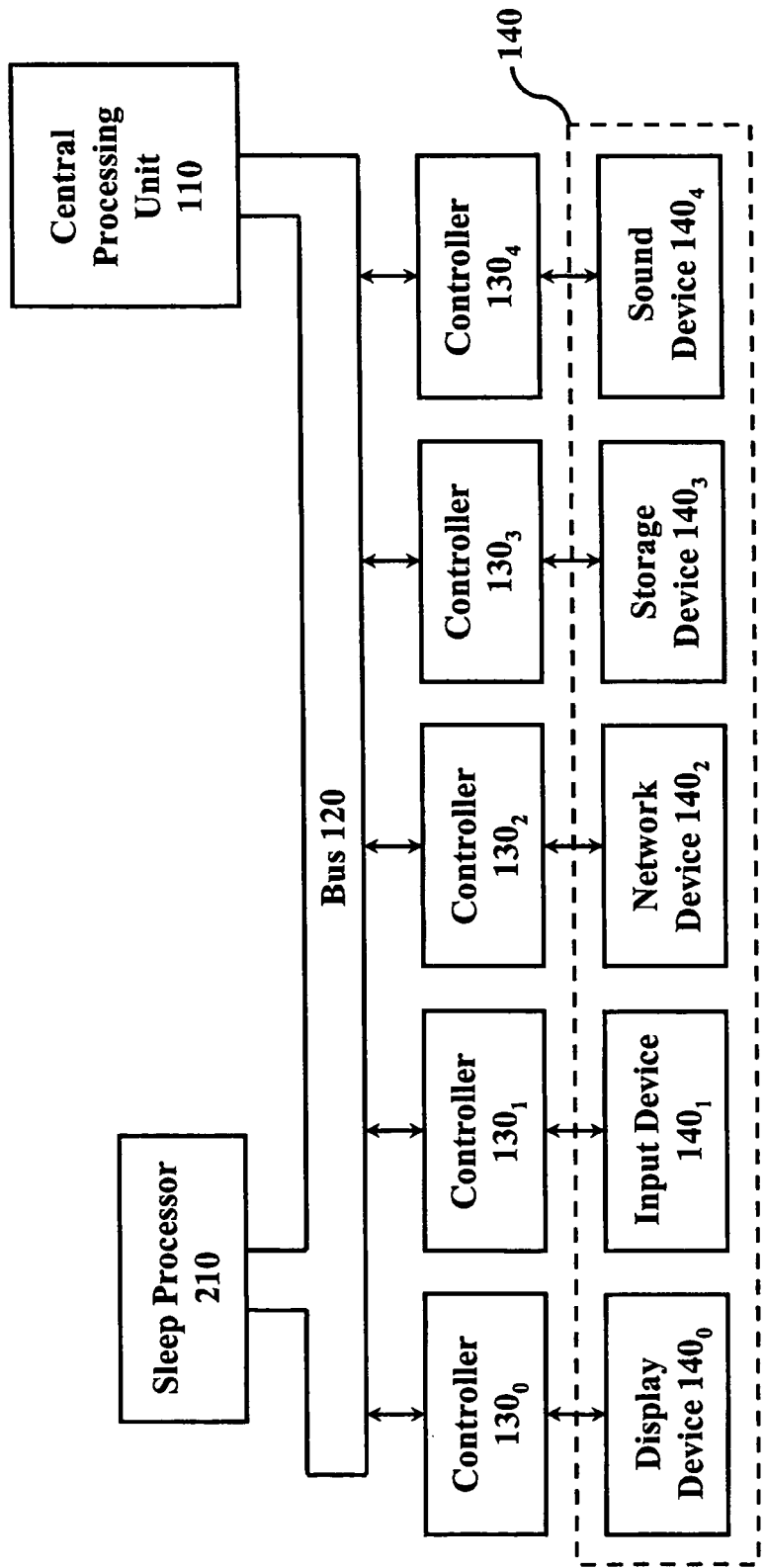
FIG. 2 is an illustration of an embodiment of an apparatus for optimizing computer performance while a first processor is in a sleep mode of operation.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the relevant art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is an illustration of a conventional computer system 100. Computer system 100 includes a central processing unit (CPU) 110, a bus 120, controllers $130_0$-$130_4$, and peripheral devices 140. Controllers $130_0$-$130_4$ are coupled to peripheral devices 140. Peripheral devices 140 can include, for example, a display device $140_0$, an input device $140_1$, a network device $140_2$, a storage device $140_3$, and a sound device $140_4$.

CPU 110 communicates with controllers $130_0$-$130_4$ and, in turn, peripheral devices 140 through bus 120. Bus 120 provides a channel or path between CPU 110 and peripheral devices 140. Bus 120 can be, for example, a combination of a system bus to connect CPU 110 to main memory (e.g., Random Access Memory (RAM)) and a Peripheral Component Interface (PCI) bus to connect CPU 110 to display device $140_0$ (e.g., monitor), input device $140_1$ (e.g., external video camera), network device $140_2$ (e.g., internet connection), storage device $140_3$ (e.g., hard drive), and sound device $140_4$ (e.g., sound adapter). In the alternative, a person skilled in relevant art will recognize that other types of bus architectures can be used in connecting CPU 110 to peripheral devices 140 such as, for example, PCI Extended (PCIe) and PCI Express (PCI-X) bus architectures.

Controllers $130_0$-$130_4$ direct data traffic between CPU 110 and peripheral devices 140. Since the components in peripheral devices 140 share bus 120, controllers $130_0$-$130_4$ provide a means to coordinate data traffic between each component in peripheral devices 140 and CPU 110. For instance, in a sleep mode of operation, controllers $130_0$-$130_4$ can issue a signal received from CPU 110 to their respective peripheral devices indicating that CPU 110 will not be receiving data during sleep mode. Thus, these peripheral devices may be powered down during sleep mode. Similarly, in a transition from sleep mode to active mode, controllers $130_0$-$130_4$ can issue a signal from CPU 110 indicating that CPU 110 can receive data from peripheral devices 140 and awake these peripheral devices.

When CPU 110 is not used, computer system 100 typically enters a sleep mode of operation. A widely-used industry standard for defining power management in computer systems is the Advanced Configuration and Power Interface (ACPI) specification. The ACPI specification defines five sleep states (S1-S5) for a ACPI-compliant computer, where each state powers down specific devices in the computer. Each sleep state introduces greater power savings but requires commensurately more time to awaken and begin performing work (e.g., S1 has a shorter work-latency time than S2, S3, S4, and S5; S2 has a shorter work-latency time than S3, S4, and S5; and, so forth). It is advantageous for computer system 100 to remain in a sleep mode of operation, especially in a deeper sleep state, in order to reduce power consumption and thermal cycles of key components in the system, thus increasing the lifetime and reliability of the computer.

In a S1 sleep mode of operation, computer system 100 is rendered inactive and although power to CPU 110 is maintained, CPU 110 stops executing instructions. Although CPU 110 is inactive, CPU 110 and a main memory of computer system 100 (not shown) remain powered on. Additional devices also maintain power, such as, for example, a keyboard, a mouse, USB ports, and expansion cards, so that a user input from these devices can wake the computer. Further, devices that encompass firmware in its hardware (e.g., CD-ROM) may also remain powered on since these devices may run independently from CPU 110. Other devices that do not have embedded firmware or indicate that they must remain on during the S1 sleep state are powered down. For example, display device $140_0$, input device $140_1$, network device $140_2$, storage device $140_3$, and sound device $140_4$ can be powered down during a S1 sleep mode of operation.

In a S2 sleep mode of operation, which is a deeper sleep state than S1, CPU 110 is powered down. However, the main memory of computer system 100 remains powered on. The main memory remains powered on so that the computer's operating system and open applications executed by the user remains in the same state as prior to computer system 100 entering sleep mode. A S3 sleep mode of operation, a deeper sleep state than S1 and S2, operates in a similar manner as the S2 sleep mode of operation, but additional devices in computer system 100 (not described herein) are powered down.

In a S4 sleep mode of operation, which is a deeper sleep state than S1-S3, CPU 110 is not only powered down, but the main memory is also powered down. All contents of the main memory are saved to a non-volatile memory device (e.g., the computer's hard drive), preserving the state of the operating system and open applications, prior to the main memory powering down.

Lastly, in a S5 sleep mode of operation, which is the deepest sleep state in the ACPI specification, many of the devices in computer system 100 are powered down except for a few devices that remain powered on so that the computer can wake from a user input. For example, the keyboard, mouse, or USB ports may remain powered on so that a user input from these devices (e.g., keystroke on the keyboard, click of the mouse, or insertion of USB device in a USB port) wakes computer system 100 from sleep mode.

As indicated above in reference to the S1-S5 sleep modes of operation, more devices in the computer power down as the computer enters various sleep states. In turn, as computer system 100 enters deeper sleep states, computer system 100 dissipates less power since additional devices are powered down at each progressive sleep state. In current computer architecture designs, CPU 110 exits sleep mode and resumes an active mode of operation when the user needs to execute an application on computer system 100.

For certain computer applications, the application executed by the user may not require optimal performance from CPU 110. For instance, CPU 110 may be designed to handle applications with intense and highly complex code instructions such as, for example, graphics functions that must be executed at a high CPU clock speed. Inherently, since CPU 110 can handle these types of complex code instructions, CPU 110 can also handle applications that do not require such processing performance. However, since CPU 110 runs at the same clock frequency for complex applications as less computationally intensive applications, CPU 110 unnecessarily expends more power in running these less computationally intensive applications. This leads to power management inefficiency in CPU 110, thus degrading the lifetime and reliability of computer system 100.

As computer system 100 continues to exit sleep mode to execute less computationally intensive applications, CPU 110 unnecessarily expends more power than required, which can increase the risk of device failure. An apparatus and method is needed to overcome this drawback of conventional computing system 100. This apparatus and method increases efficiency in the power management of the computer system by incorporating a secondary processor to run applications that may not otherwise be executed while a primary processor (e.g., CPU 110) is in sleep mode.

In the following description, for purposes of explanation, specific details are set forth to provide a thorough understanding of the present invention. It will be evident, however, to one skilled in the relevant art that the present invention can be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

FIG. 2 is an illustration of an embodiment of an apparatus 200 for optimizing computer performance while a first processor is in a sleep mode of operation. Apparatus 200 can optimize efficiency in the power management of a computer system by enabling a secondary processor to perform certain functions while the first processor is in sleep mode. These functions include applications that may not otherwise be executed while the first processor is in sleep mode.

Apparatus 200 includes a secondary processor 210 (referred to herein as a secondary processor or sleep processor), CPU 110, bus 120, controllers $130_0$-$130_4$, and peripheral devices 140. Peripheral devices 140 can include, for example, a display device $140_0$, an input device $140_1$, a network device $140_2$, a storage device $140_3$, and a sound device $140_4$. CPU 110, bus 120, controllers $130_0$-$130_4$, and peripheral devices 140 function in a similar manner to that described in FIG. 1.

Although sleep processor 210, as described herein, can operate while CPU 110 is in sleep mode, a person of ordinary skill in the relevant art will recognize that sleep processor 210 can also be configured to operate while CPU 110 is in active mode. For instance, when computing bandwidth of CPU 110 is overloaded, sleep processor 210 can be configured to help alleviate the CPU's bandwidth by performing particular tasks of CPU 110 during active mode. Further, a person of ordinary skill in the relevant art will also recognize that, although sleep processor 210 is shown as a separate element from CPU 110 in FIG. 2, sleep processor 210 can be implemented within CPU 110. For example, sleep processor 210 can be fabricated on the same integrated circuit or within the same circuit package as CPU 110.

Figure 3:
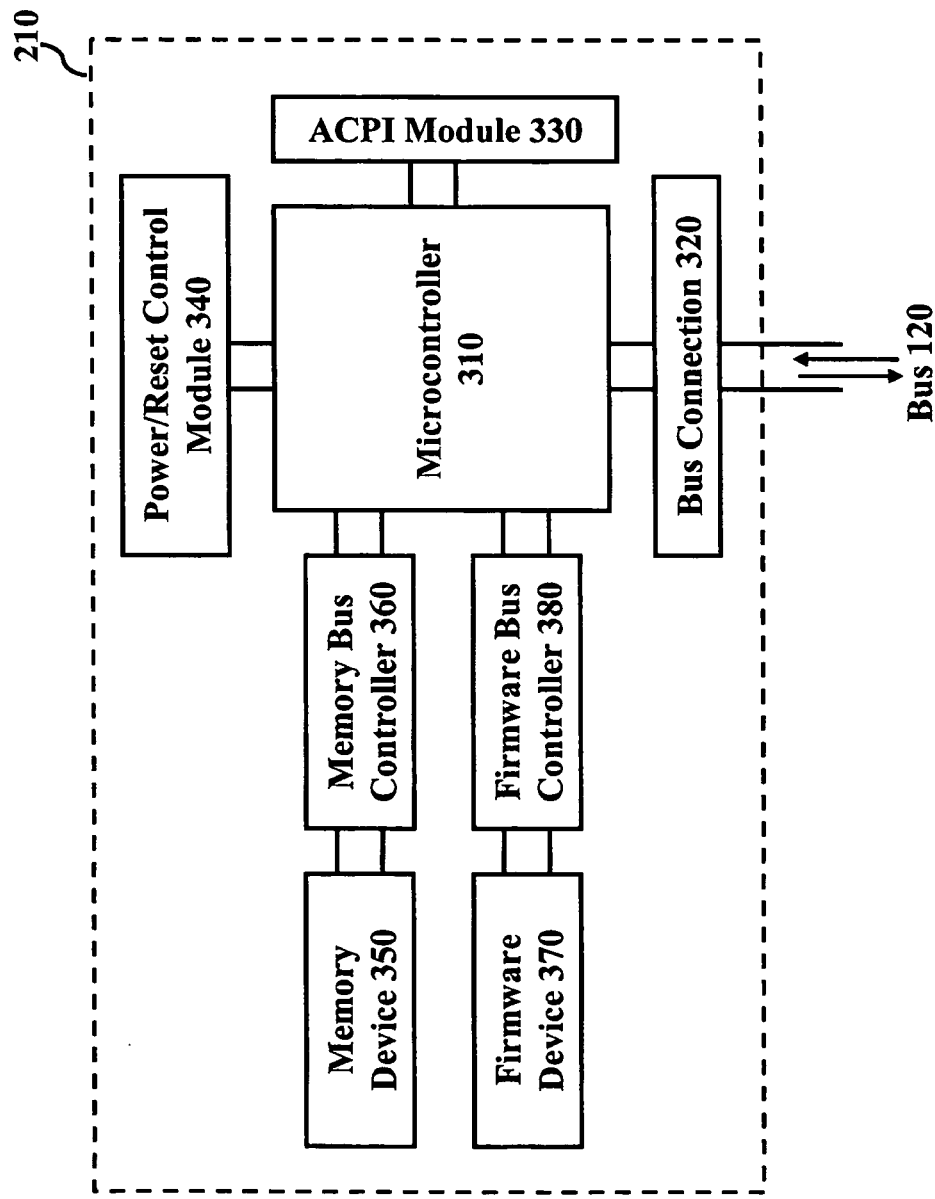
FIG. 3 is an illustration of an embodiment of a sleep processor.

FIG. 3 is an illustration of an embodiment of sleep processor 210. Sleep processor 210 includes a microcontroller 310, a bus connection 320, a ACPI module 330, a power/reset control module 340, a memory device 350, a memory bus controller 360, a firmware device 370, and a firmware bus controller 380. Microcontroller 310 communicates with CPU 110 and controllers $130_0$-$130_4$ (in FIG. 2) through bus connection 320. Bus connection 320 provides an interface between microcontroller 310 and the rest of the computer system via bus 120, where bus connection 320 can be a commonly-used bus interface implemented in computer systems such as, for example, PCIe and PCI-X computer bus architectures. Computer bus architectures are known to those persons of ordinary skill in the relevant art.

ACPI module 330 controls the power management of apparatus 200 during sleep modes of operation. As described above with respect to FIG. 1, a computer system can enter various sleep mode states, where each sleep state progressively powers down additional components in the computer system. In conjunction with microcontroller 310, ACPI module 330 can be configured to control the powering down of particular peripheral devices 140 during each sleep state. For example, in referring to FIG. 2, input device $140_1$ and sound device $140_4$ can be configured to power down, whereas display device $140_0$, network device $140_2$, and storage device $140_3$ remain powered on during a S1 sleep mode of operation. Here, ACPI module 330 communicates with microcontroller 310 to issue a shutdown signal to power/reset control module 340 to power down controller $130_1$, input device $140_1$, controller $130_4$, and sound device $140_4$. A person of ordinary skill in the relevant art will recognize that ACPI module 330 can be configured to power down one or more peripheral devices 140 during various sleep modes of operation.

Figure 4:
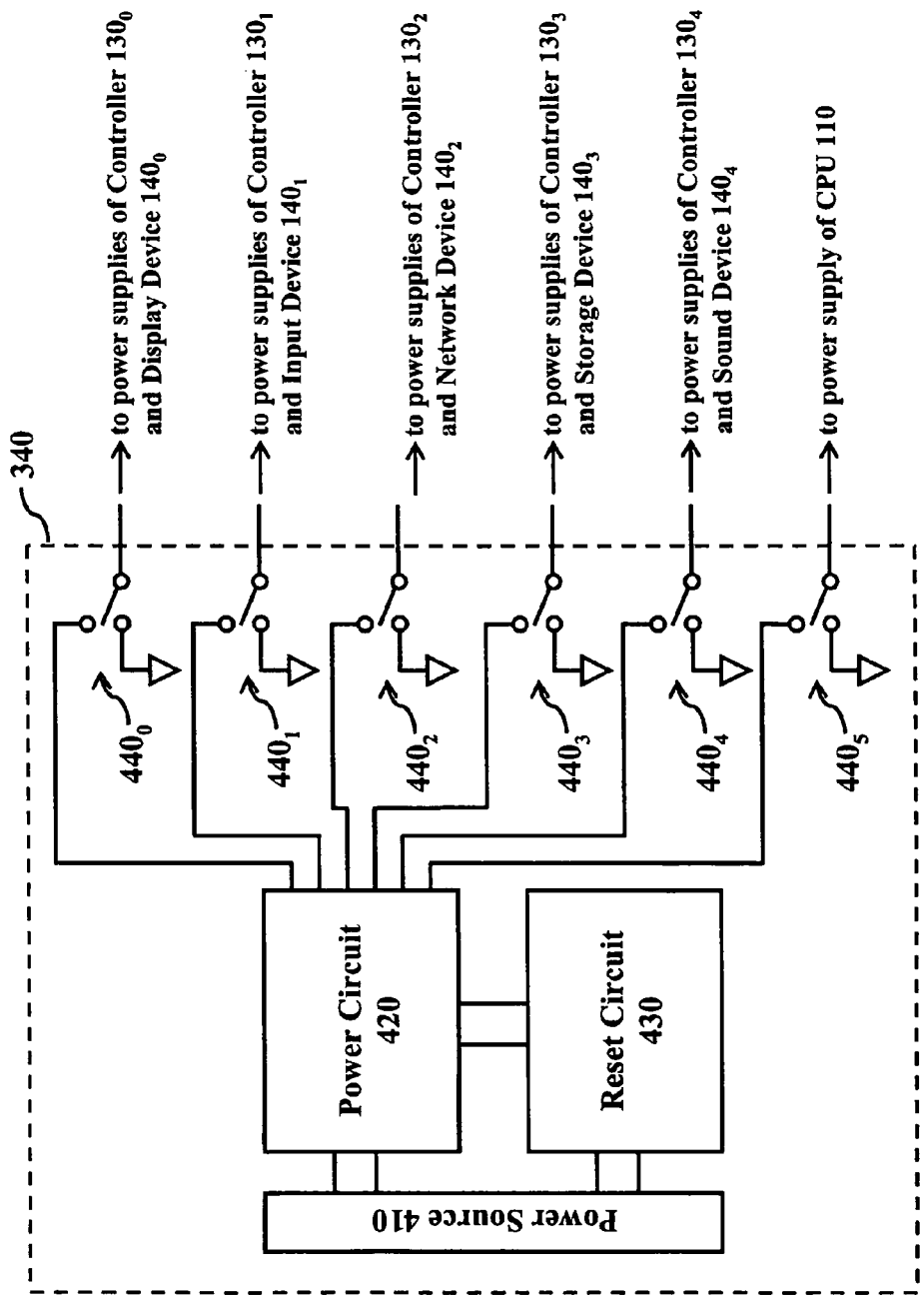
FIG. 4 is an illustration of an embodiment of a power/reset control module.

FIG. 4 is an illustration of an embodiment of power/reset control module 340. Power/reset control module 340 includes a power source 410, a power circuit 420, a reset circuit 430, and switches $440_0$-$440_5$. Power source 410 provides power to apparatus 200 from an external power source such as, for example, a 120V wall outlet. Power circuit 420 regulates a power signal from power source 410 to an appropriate voltage level for apparatus 200 and then distributes the regulated power signal to devices in apparatus 200 (i.e., CPU 110, controllers $130_0$-$130_4$, peripheral devices 140, and sleep processor 210). Power circuit 420 selectively controls the distribution of power to devices in apparatus 200 through switches $440_0$-$440_5$. Thus, during a sleep mode of operation, microcontroller 310 can communicate with power circuit 420 to power down particular peripheral devices 140 through switches $440_0$-$440_5$.

Reset circuit 430 provides reset lines to apparatus 200 and resets power in apparatus 200 when necessary. In an embodiment, the functions of power and reset in power/reset control module 340 are tightly linked. For instance, during a power up sequence of apparatus 200, reset lines are asserted in apparatus 200 until a stabilization of an appropriate power level. Power circuit 420 can generate a signal (e.g., POWERGOOD signal) to indicate that the appropriate power level has been reached and, upon assertion of the signal, the reset lines can be de-asserted from apparatus 200. In another example, power circuit 420 may receive a power surge from power source 410, which triggers reset circuit 430 to power down and then power up apparatus 200 after a pre-defined amount of time (e.g., an appropriate amount of time for the power surge to subside).

In referring to FIG. 3, firmware device 370 stores a computer program executed by microcontroller 310. In another embodiment, the computer program executed by microcontroller 310 can be stored in a non-volatile memory (not shown) used by CPU 110 to reduce overall circuit area of sleep processor 210. An example of non-volatile memory used by CPU 110, in which the computer program can be stored, is BIOS flash EEPROM.

The computer program stored in firmware device 370 is design-specific and can perform specific tasks. For example, firmware device 370 can be configured to store a program to perform maintenance and diagnostic tasks required by the computer's operating system. These tasks include, for example, a disk defragmentation, a virus scan, a download of updates, and a memory test and initialization. Since these types of tasks do not require human interaction or the full performance capability of CPU 110, it is advantageous for microcontroller 310 to run these applications while CPU 110 is in sleep mode. Further, microcontroller 310 can run these tasks at a slower clock frequency, over a longer period of time, in order to reduce overall power consumption in the computer system.

A person of ordinary skill in the relevant art will recognize that, although it may be advantageous for microcontroller 310 to perform specific tasks while CPU 100 is in sleep mode, firmware device 370 and microcontroller 310 can also be configured to encompass substantially similar functions as CPU 110.

Firmware bus controller 380 provides a data link between firmware device 370 and microcontroller 310. Firmware bus controller 380 can be, for example, a serial peripheral bus interface. In the alternative, other types of communication data links can be used for firmware bus controller 380.

Memory device 350 serves as a main memory for microcontroller 310. Microcontroller 310 reads instructions from memory 350 and executes the instructions. Further, any data actively operated on by microcontroller 310 can also be stored in memory device 350. An example of memory device 350 is RAM. Memory bus controller 360 provides an interface between memory device 350 and microcontroller 310 so that microcontroller 310 can read from and write to memory device 350.

Figure 5:
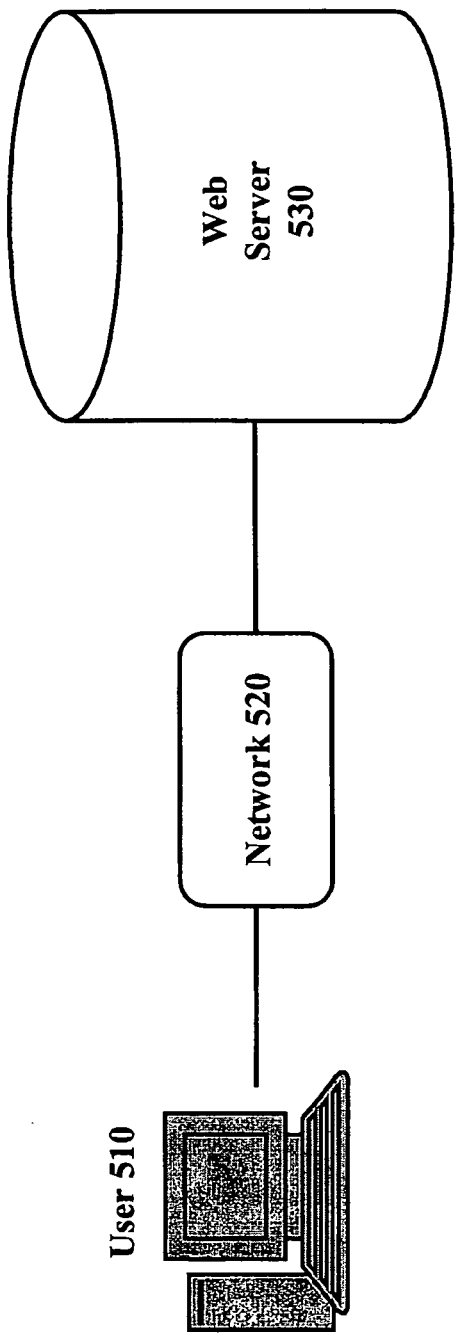
FIG. 5 is an illustration of an example network that includes a web server implementing an embodiment of a sleep processor.

To provide an example of sleep processor 210 incorporated into a system design, it will be assumed, for example purposes, that sleep processor 210 is part of a computing network 500. FIG. 5 is an illustration of an example computing network 500 that includes a user 510, a network 520, and a web server 530. Network 520 can be either a public or private communications network (e.g., internet or corporate network intranet). Communications networks are known to those persons of ordinary skill in the relevant art. In this example, web server 530 implements sleep processor 210 in accordance with an embodiment of the present invention.

Figure 6:
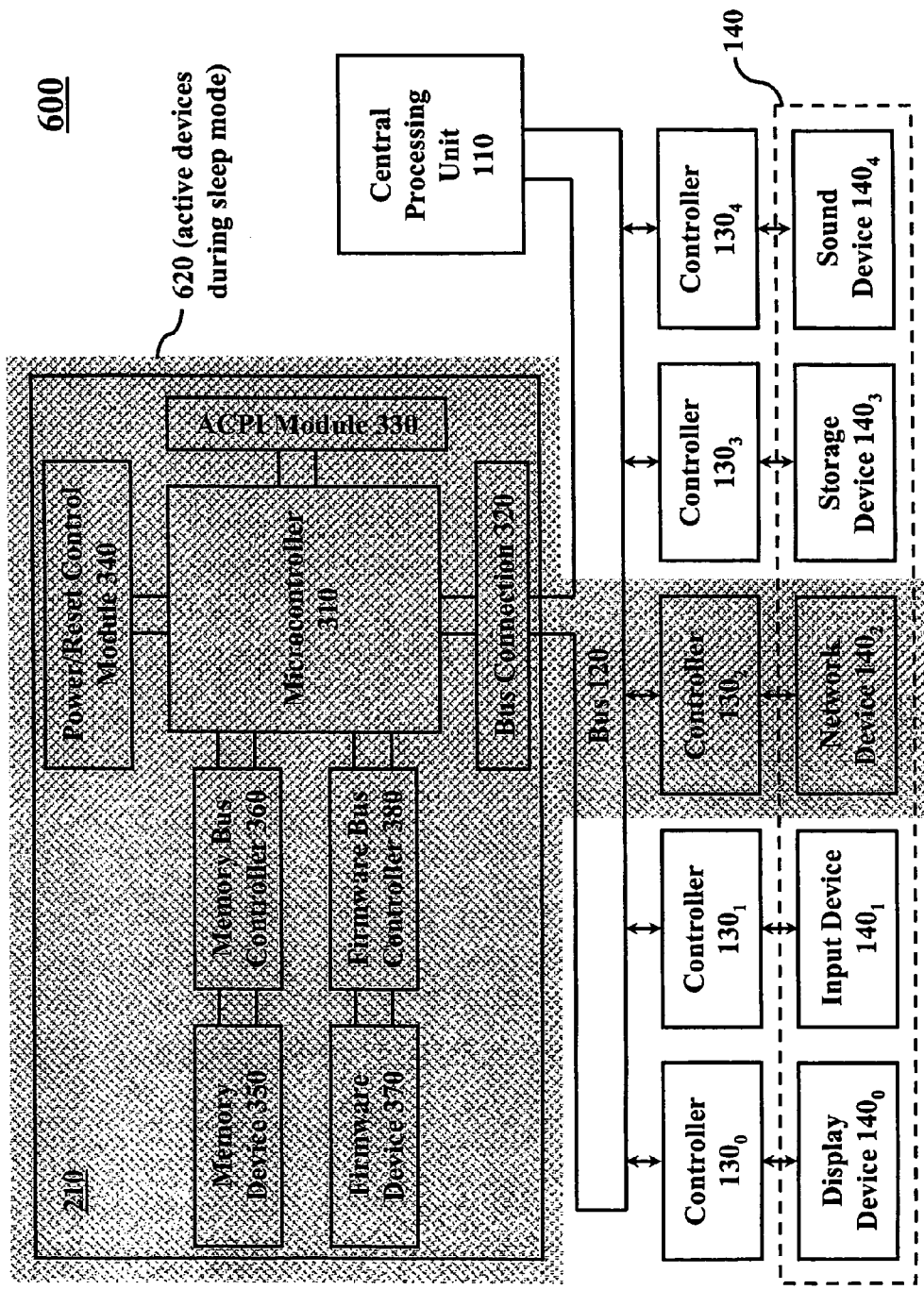
FIG. 6 is an illustration of an example computer system in a web server that includes an embodiment of a sleep processor.

FIG. 6 is an illustration of an example computer system 600 in web server 530. Computer system 600 can be used to reply to requests from user 510 over network 520. Computer system 600 includes sleep processor 210, CPU 110, bus 120, controllers $130_0$-$130_4$, and peripheral devices 140. Sleep processor 210 communicates with network device $140_2$ (e.g., network router communicating over network 520) while CPU 110 is in sleep mode, as indicated by a shaded area 620 in FIG. 6. Display device $140_0$, input device $140_1$, storage device $140_3$, sound device $140_4$, and their respective controllers $130_0$-$130_1$ and $130_3$-$130_4$ are inactive during sleep mode.

After a period of inactivity, computer system 600 enters a sleep mode of operation, where sleep processor 210 and network device $140_2$ remain active. In transitioning from an active mode to a sleep mode of operation, ACPI module 330 communicates with microcontroller 310 to issue a shutdown signal to power/reset control module 330 to power down CPU 110, controllers $130_0$-$130_1$ and $130_3$-$130_4$, display device $140_0$, input device $140_1$, storage device $140_3$, and sound device $140_4$. In referring to FIG. 4, switches $440_0$-$440_1$ and $440_3$-$40_4$ are switched to a ground connection when these devices are powered down.

Figure 7:
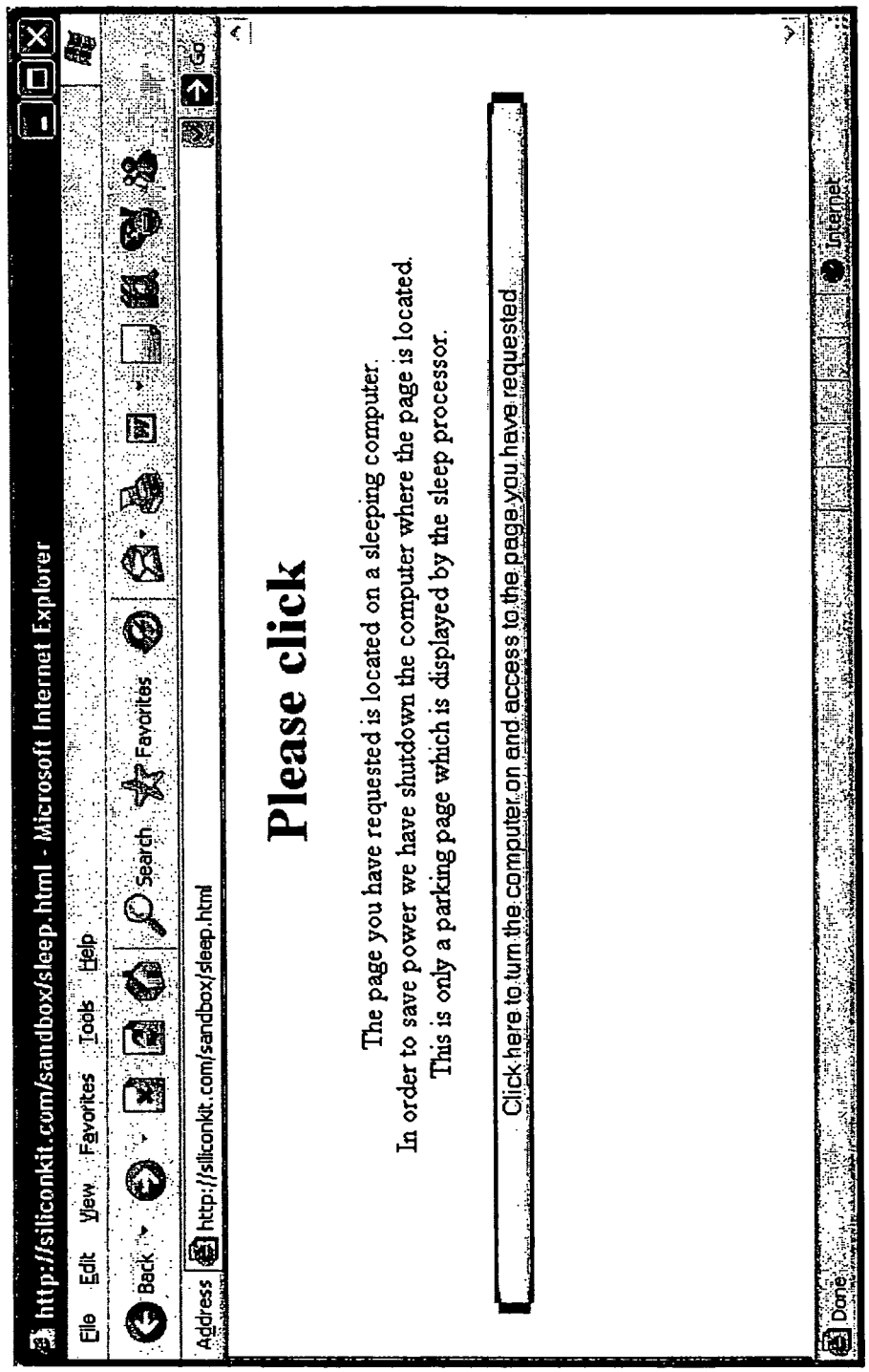
FIG. 7 is an illustration of an example status message that can be received by a user accessing a web server in a sleep mode of operation.

In this sleep mode example, the functionality of sleep processor 210 is limited to simple functions, which do not encompass the full performance provided by CPU 110. For instance, when user 510 attempts to send a web page request to web server 530, sleep processor 210 can send a response over network 520 to user 510 with a message indicating the status of web server 530. The computer program instructing microcontroller 310 (in sleep processor 210) to send the status message is stored in firmware device 370. FIG. 7 is an illustration of an example status message 700 that sleep processor 210 can send to user 510.

As indicated by the example status message 700, computer system 600 provides user 510 an option to open the requested web page. If user 510 decides to access the web page, then sleep processor 210 restores power to CPU 110. CPU 110, in turn, exits sleep mode and replies to the web page request by user 510. On the other hand, if user 510 decides not to access the web page, then CPU 110 remains in sleep mode. Sleep processor 210, as a result, reduces the overall power consumed by computer system 600 since sleep processor 210, and not CPU 110, queried user 510 to access the web page.

In sum, since a simple task such as sending a status message to user 510 over network 520 is performed by sleep processor 210, CPU 110 is not required to exit sleep mode to perform the status message operation. If CPU 100 were required to perform this operation, then this would be an inefficient use of power expended by CPU 110 because CPU 110 may be designed for more complex tasks, such as retrieving web page information from web server 530, rather than sending a status message to user 510. Sleep processor 210, instead, can perform the simple task of sending the status message over network 520, thus reducing the overall power consumption of computer system 600.

A person of ordinary skill in the relevant art will recognize that other tasks can be performed by sleep processor 210. For example, sleep processor 610 can be designed to perform maintenance and diagnostic tasks required by an operating system of computer system 600.

Figure 8:
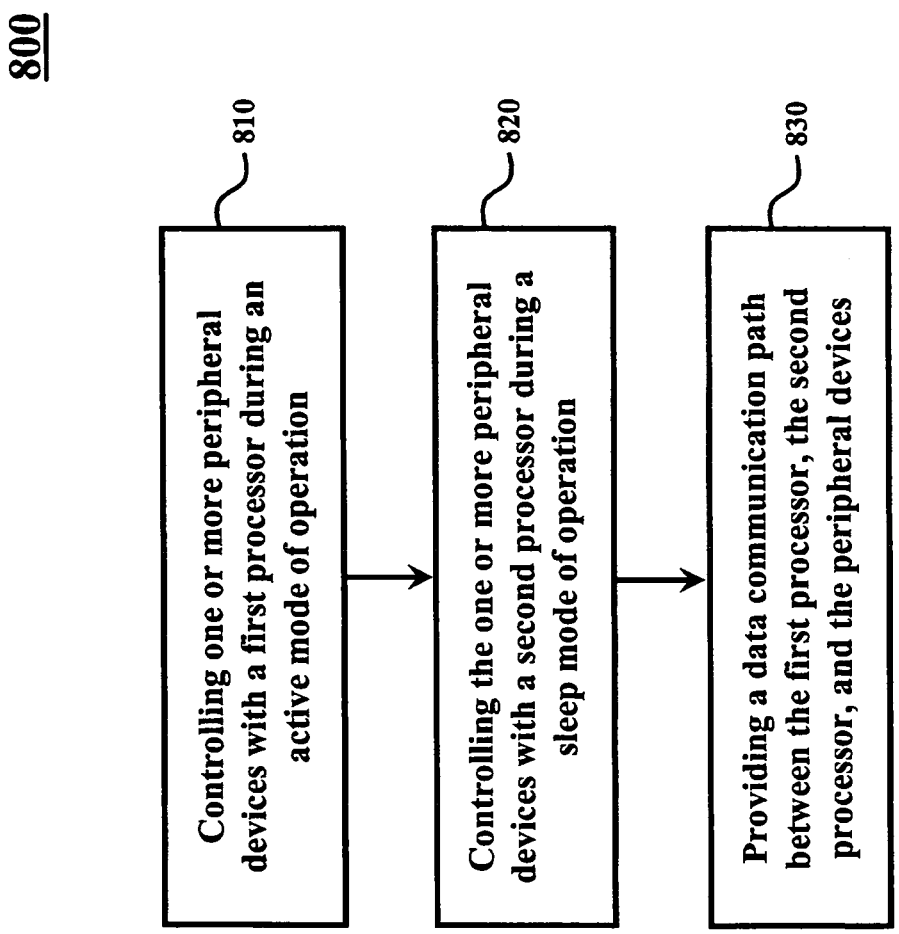
FIG. 8 is an illustration of an embodiment of a method for optimizing computer performance while a first processor is in a sleep mode of operation.

FIG. 8 is an illustration of an embodiment of a method 800 for optimizing computer performance while a first processor is in sleep mode. Method 800 can occur, for example, using apparatus 200. In step 810, one or more peripheral devices are controlled by a first processor during an active mode of operation. The one or more peripheral devices can be a wide variety of devices controlled by the first processor such as, for example, a display device, a storage device, and a sound device. Further, the first processor can be a CPU configured to control functions of the computer system incorporating the first processor. In controlling the one or more peripheral devices, the first processor can manage a communication link (e.g., data traffic) between itself and the one or more peripheral devices.

In step 820, the one or more peripheral devices are controlled by a second processor during the sleep mode of operation. The second processor can also be referred to as a "sleep" processor since it can control certain functions of the computer during sleep mode. Among other functions, the sleep processor can control functions of the one or more peripheral devices that could not otherwise be controlled while the first processor is in sleep mode. For example, maintenance and diagnostic tasks may only be performed while the first processor is in an active mode of operation. The sleep processor can be configured to perform these types of tasks. The sleep processor can also be configured to run these tasks at a slower clock frequency, over a longer period of time, in order to reduce overall power consumption in the computer system. Further, although the sleep processor is described as operating while the first processor is in sleep mode, a person of ordinary skill in the relevant will recognize that the sleep processor can be configured to operate in conjunction with the first processor during an active mode of operation.

In step 830, a data communication path is provided between the first processor, the second processor, and the one or more peripheral devices. Bus 120 in FIG. 2 can be used, for example, to provide the data communication path between the devices. Further, bus connection 320 in FIG. 3 can be used, for example, to provide an interface between the second processor and the first processor and the one or more peripheral devices.

In addition to hardware implementations of devices that provide the sleep processor described above in the exemplary embodiments of the present invention, such devices can also be embodied in software disposed, for example, in a computer usable (e.g., readable) medium configured to store the software (e.g., a computer readable program code). The program code causes the enablement of embodiments of the present invention, including the following embodiments: (i) the functions of the methods and systems disclosed herein (such as systems and methods incorporating the sleep processor); (ii) the fabrication of the systems and methods disclosed herein (such as the fabrication of devices that are enabled to provide a sleep processor structure); or, (iii) a combination of the functions and fabrication of the systems and methods disclosed herein.

For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). These programming tools can model the behavior of an electronic system, where the system can be synthesized into a gate netlist and then ultimately fabricated into a hardware device. The program code can be disposed in any known computer usable medium including semiconductor, magnetic disk, optical disk (such as CD-ROM, DVD-ROM) and as a computer data signal embodied in a computer usable (e.g., readable) transmission medium (such as a medium including digital, optical, or analog-based medium). As such, the code can be transmitted over communication networks including the Internet and internets. It is understood that the functions accomplished and/or structure provided by the systems and techniques described above can be represented in a core (such as a media processing core) that is embodied in program code and may be transformed to hardware as part of the production of integrated circuits.

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. An apparatus comprising:
   one or more peripheral devices coupled to a first processor, wherein the first processor is configured to control the one or more peripheral devices during an active mode of operation; and
   a second processor comprising a power/reset control module, the second processor is configured to control at least one of the one or more peripheral devices during a sleep mode of operation,
   wherein after a period of inactivity, the power/reset control module is configured to use one or more switches to selectively shunt a power supply to the first processor and at least one of the one or more peripheral devices to transition to the sleep mode of operation,
   wherein the second processor is configured to perform substantially similar functions as the first processor.

2. The apparatus of claim 1, further comprising a bus configured to provide a data communication path between the first processor, the second processor, and the one or more peripheral devices.

3. The apparatus of claim 1, wherein the second processor is coupled to the one or more peripheral devices.

4. The apparatus of claim 1, wherein at least one of the one or more peripheral devices comprises a controller configured to manage data traffic between at least one of the one or more peripheral devices and the first and second processors.

5. The apparatus of claim 1, wherein the second processor is configured to control at least one of the one or more peripheral devices that could not otherwise be controlled while the first processor is in the sleep mode of operation.

6. The apparatus of claim 1, wherein the second processor comprises:
   a microcontroller coupled to the power/reset control module;
   an Advanced Configuration and Power Interface module coupled to the microcontroller and configured to control power management of the computer;
   a bus connection coupled to the microcontroller and configured to provide an interface between, the microcontroller and the first processor and the one or more peripheral devices;
   a firmware device coupled to the microcontroller and configured to store a computer program executed by the microcontroller; and
   a memory device coupled to the microcontroller and configured to store program instructions and data for the microcontroller.

7. The apparatus of claim 6, wherein the power/reset control module comprises:
   a power source;
   a power circuit coupled to the power source and configured to regulate a voltage from the power source to an appropriate voltage for the computer; and
   a reset circuit coupled to the power source and power circuit and configured to reset power to the computer when a surge in power exists in the power source.

8. The apparatus of claim 1, wherein the second processor is configured to operate at a slower clock frequency than the first processor.

9. The apparatus of claim 1, wherein the second processor is configured control a maintenance and diagnostic task of the computer while the first processor is in the sleep mode of operation.

10. A method comprising:
controlling one or more peripheral devices with a first processor during an active mode of operation; and
controlling at least one of the one or more peripheral devices with a second processor comprising a power/reset control module, during a sleep mode of operation,
wherein after a period of inactivity, the power/reset control module is configured to use one or more switches to selectively shunt power to the first processor and at least one of the one or more peripheral devices to transition to the sleep mode of operation,
wherein the second processor is configured to perform substantially similar functions as the first processor.

11. The method of claim 10, further comprising:
providing a data communication path between the first processor, the second processor, and the one or more peripheral devices.

12. The method of claim 10, wherein the controlling the one or more peripheral devices with the first processor comprises managing data traffic between the one or more peripheral devices and the first processor.

13. The method of claim 10, wherein the controlling at least one of the one or more peripheral devices with the second processor comprises controlling functions of at least one of the one or more peripheral devices that could not otherwise be controlled while the first processor is in the sleep mode of operation.

14. The method of claim 10, wherein the controlling the one or more peripheral devices with the second processor comprises operating, in conjunction with the first processor during the active mode of operation.

15. The method of claim 10, wherein the controlling the one or more peripheral devices with the second processor comprises operating at a slower clock frequency than the first processor.

16. A system comprising:
a first module configured to control one or more peripheral devices with a first processor during an active mode of operation; and
a second module with a second processor comprising a power/reset control module configured to control at least one of the one or more peripheral devices during a sleep mode of operation,
wherein after a period of inactivity, the power/reset control module is configured to use one or more switches to selectively shunt a power supply to the first processor and at least one of the one or more peripheral devices to transition to the sleep mode of operation,
wherein the second processor is configured to perform substantially similar functions as the first processor.

17. The system of claim 16, further comprising:
a third module configured to provide a data communication path between the first processor, the second processor, and the one or more peripheral devices.

18. The system of claim 16, wherein the first module comprises:
a module configured to manage data traffic between the one or more peripheral devices and the first processor.

19. The system of claim 16, wherein the second module comprises:
a module configured to control functions of at least one of the one or more peripheral devices that could not otherwise be controlled while the first processor is in the sleep mode of operation.

20. The system of claim 16, wherein the second module comprises:
a module configured to operate in conjunction with the first processor during the active mode of operation.

21. The system of claim 16, wherein the second module comprises:
a module configured to operate at a slower clock frequency than the first processor.

22. A non-transitory computer-readable medium carrying one or more sequences of one or more instructions execution of which by one or more processor cause the processors to perform operations comprising:
controlling one or more peripheral devices with a processor during an active mode of operation; and
controlling at least one of the one or more peripheral devices with a second processor comprising a power/reset control module, during a sleep mode of operation,
wherein after a period of inactivity, the power/reset control module is configured to use one or more switches to selectively shunt a power supply to the first processor and at least one of the one or more peripheral devices to transition to the sleep mode of operation,
wherein the second processor is configured to perform substantially similar functions as the first processor.

23. The non-transitory computer-readable medium of claim 22, further comprising:
providing a data communication path between the first processor, the second processor, and the one or more peripheral devices.

* * * * *

UNITED STATES PATENT AND TRADEMARK OFFICE
CERTIFICATE OF CORRECTION

| | | |
|---|---|---|
| PATENT NO. | : 8,683,247 B2 | Page 1 of 1 |
| APPLICATION NO. | : 12/137630 | |
| DATED | : March 25, 2014 | |
| INVENTOR(S) | : Mikhael Y. Lerman | |

It is certified that error appears in the above-identified patent and that said Letters Patent is hereby corrected as shown below:

In the Claims

<u>Column 12</u>

Line 30 please replace "more processor cause" with --more processors cause--.

<u>Column 12</u>

Line 32, please replace "with a processor" with --with a first processor--.

Signed and Sealed this
Sixteenth Day of September, 2014

Michelle K. Lee
*Deputy Director of the United States Patent and Trademark Office*